US012725388B2

(12) United States Patent
Prasad et al.

(10) Patent No.: US 12,725,388 B2
(45) Date of Patent: Sep. 1, 2026

(54) SYSTEM AND METHOD FOR GENERATING A FRONTAL FACING VIEW OF A USER

(71) Applicant: Talent Unlimited Online Services Private Limited, South Delhi (IN)

(72) Inventors: Ankit Prasad, Jamshedpur (IN); Rahul Prasad, Gurugram (IN); Mudit Rastogi, Raebareli (IN); Abdul Manaf F, Alappuzha (IN)

(73) Assignee: Talent Unlimited Online Services Private Limited, South Delhi (IN)

( * ) Notice: Subject to any disclaimer, the term of this patent is extended or adjusted under 35 U.S.C. 154(b) by 252 days.

(21) Appl. No.: 18/747,923

(22) Filed: Jun. 19, 2024

(65) Prior Publication Data

US 2025/0285399 A1 Sep. 11, 2025

(30) Foreign Application Priority Data

Mar. 7, 2024 (IN) ............................ 202411016454

(51) Int. Cl.

| | |
|---|---|
| ***G06V 10/24*** | (2022.01) |
| ***G06V 10/77*** | (2022.01) |
| ***G06V 10/82*** | (2022.01) |
| ***G06V 40/16*** | (2022.01) |

(52) U.S. Cl.
CPC .......... *G06V 10/24* (2022.01); *G06V 10/7715* (2022.01); *G06V 10/82* (2022.01); *G06V 40/162* (2022.01); *G06V 40/166* (2022.01); *G06V 40/168* (2022.01); *G06V 40/172* (2022.01)

(58) Field of Classification Search
USPC .......................................................... 382/156
See application file for complete search history.

(56) References Cited

U.S. PATENT DOCUMENTS

2024/0303883 A1* 9/2024 Ozkan .................... G06V 10/82

* cited by examiner

*Primary Examiner* — Jacky X Zheng
(74) *Attorney, Agent, or Firm* — Kolisch Hartwell, P.C.

(57) ABSTRACT

A system and a method for generating a frontal-facing view of the user includes an electronic device, an application module, and a trained machine-learning model. The trained machine-learning model is communicatively coupled with the electronic device and the application module, and enables the application module to perform certain operational steps for generating the frontal-facing view of the user. The trained machine-learning model is configured to automatically identify, through an encoder module, at least one learning style from at least one feature map. The trained machine-learning model is further configured automatically to generate, through a face-frontalization module, the frontal facing view of the user.

20 Claims, 5 Drawing Sheets

(SYSTEM)

FIG. 1 (SYSTEM)

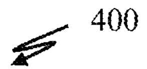
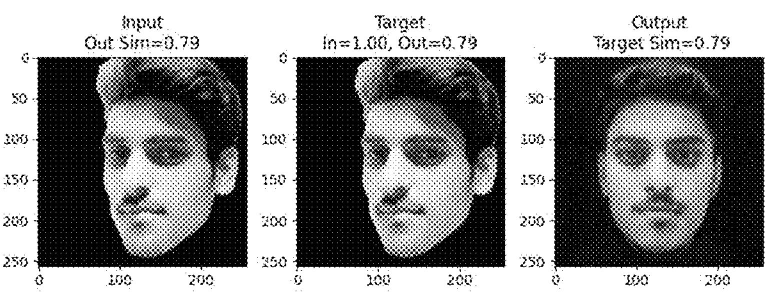
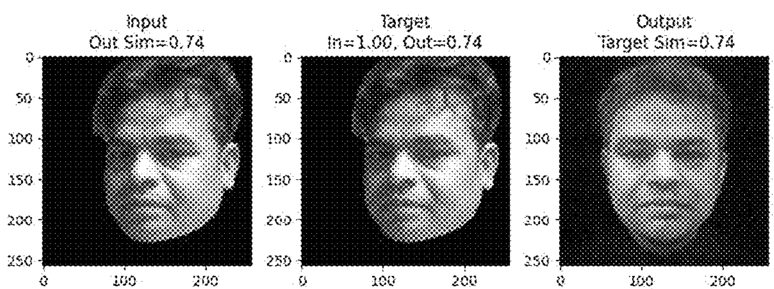
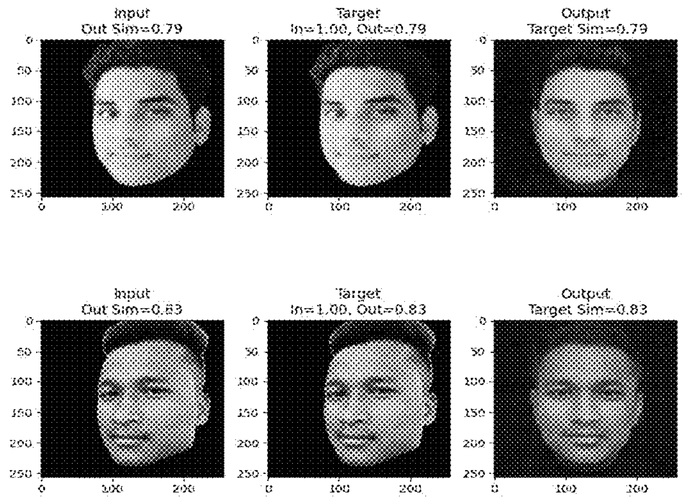
FIG. 4

SYSTEM AND METHOD FOR GENERATING A FRONTAL FACING VIEW OF A USER

BACKGROUND

Technical Field

Embodiments described herein relates to system and method for face recognition in images on a device. More particularly, embodiments described herein relates to a system and a method for generating a frontal facing view of a user, by way of identification of faces from unrestricted views as well as recognizing faces in forward-facing poses.

Description of Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Over the past few years, several companies and organizations of different sectors have been using image processing for several applications like visualization, image information extraction, user face recognition, pattern recognition, classification, segmentation, and many more. Primarily, face recognition has been widely used in modern intelligent systems, like smart video surveillance, online payment, and intelligent access control systems. Present day frontal face recognition systems utilize face recognition algorithms that are prone to be attacked by various face presentation attacks, like printed paper, video replay, and silicone masks. Another major problem associated with the present day frontal face recognition systems is that it becomes challenging to identify faces from unrestricted views and recognize faces in forward-facing poses of a user. In recent years, face recognition has attracted lots of attention in plenty of domains. The relevant techniques can be employed in different intelligent systems, for example, smart phone unlocking and other applications. The present day frontal face recognition systems are configured to localize or detect and track various human faces by leveraging the captured images. This technique plays a highly important role in biological verification. The present day frontal face recognition systems are further configured to capture a face image from one or multiple persons by utilizing a camera, and thereafter the system compares the human face with face samples that are already fed into a face database to fulfil the recognition. However, a major drawback of the aforementioned present day frontal face recognition systems is that the technique fails to enable recognition of faces from different angles and perspectives, thereby affecting the accuracy of face identification performed by the system.

There have been many frontal face recognition systems developed recently to perform generating of frontalized face of the user. One of the systems for generating the frontalized face of the user is a deep neural network based multi-view human face recognition system utilizing technique of deep neural network to deeply encode face regions of the user and face alignment algorithm to localize key points inside the face regions. Additionally, the aforementioned face recognition system utilizes a well-known “Principal Component Analysis” (PCA) for reducing dimensionality of deep features and simultaneously, removing redundant and contaminated visual features of at least one face region of the user. Though the aforementioned multi-view human face recognition system enables recognition of the faces from the different angles and perspectives, thereby enhancing the accuracy of face identification, but a major drawback associated with the multi-view human face recognition system is that the multi-view human face recognition system is unable to address problem of quality and performance degradation due to rotated faces of the user during certain applications of face recognition. Moreover, the multi-view human face recognition system requires more memory and time to process the images related with the face region of the user which poses a difficult challenge of implementing the face identification technique on a real-time basis.

Hence, considering the above mentioned drawbacks in the currently developed frontal face recognition systems as mentioned above, there is an urgent need for an automated, dedicated, thoroughly designed, and intelligent frontal face recognition and generation system which not only ensures effectively recognizing and generating the frontal facing view of the user, but also prevents quality and performance degradation due to rotated faces, and solves the aforementioned drawbacks, by being able to identify the faces of different users from unrestricted views as well as recognizing the faces in forward-facing poses which leads to the recognition of faces from different angles and perspectives, thereby ensuring enhancement in the accuracy of face identification irrespective of orientation of the face of the user, and at the same time preserving facial attributes of the user while frontalizing the face of the user, or at least provide a useful alternative.

SUMMARY

A system and method for generating a frontal facing view of a user based on image segmentation and generation techniques integrated with machine learning in accordance with some embodiments of the invention is disclosed. The frontal facing view of the user is configured to be synthesized in at least one single and unrestricted image. The system mainly comprises of an electronic device having an imaging sensor, a memory, a processor, and a trained machine learning model. The imaging sensor is configured to capture image of the user. The memory is configured to store the captured image of the user. The processor is coupled with the memory. The electronic device comprises an application module running on a screen of the electronic device and connected with the memory and the processor. The trained machine learning model is operatively coupled with the electronic device, the memory, the processor, and the application module, and configured to perform certain operational steps. These operational steps comprises receiving, through the imaging sensor, the captured image of the user in a preview frame displayed in a field of view (FOV) of the electronic device. The operational steps further comprises extracting, through a face segmentation module, a face region of the user from the captured image. The operational steps further comprises automatically determining, through an encoder module, a plurality of feature maps corresponding to the extracted face region. The operational steps further comprises automatically identifying, through the encoder module, at least one learning style from at least one feature map of the plurality of feature maps. The operational steps further comprises determining, through a face vector module, at least one face vector of the user corresponding to the at least one learning style. The operational steps further comprises automatically generating, through a face image generator module, the frontal facing view of the user based on the at least one face vector of the captured image of the user.

In one embodiment, further, the trained machine learning model is configured for storing, through the memory, a set of multiple captured original faces of the user. Further, the trained machine learning model is configured for creating, through the encoder module, a plurality of learning styles from at least one category of the at least one feature map. The at least one feature map is selected from the plurality of feature maps.

In another embodiment, further, the trained machine learning model is configured for extracting and aligning, through the encoder module, an image data set from the captured image of the user.

In accordance with some embodiments of present inventive concepts, a method is claimed, which is configured for generating the frontal facing view of the user. The method comprises initially receiving, through the imaging sensor, the captured image of the user in the preview frame displayed in the FOV of the electronic device. Further, the method comprises extracting, through the face segmentation module, the face region of the user from the captured image. Further, the method comprises automatically determining, through the encoder module, the plurality of feature maps corresponding to the extracted face region. Further, the method comprises automatically identifying, through the encoder module, the at least one learning style from the at least one feature map of the plurality of feature maps. Further, the method comprises determining, through the face vector module, the at least one face vector of the user corresponding to the at least one learning style. Further, the method comprises automatically generating, through a face image generator module, the frontal facing view of the user based on the at least one face vector of the captured image of the user.

In one embodiment, the step of automatically determining, through the encoder module, the plurality of feature maps corresponding to the extracted face region comprises retrieving, through a feature extractor module, the plurality of feature maps corresponding to the extracted face region.

In another embodiment, the step of automatically identifying, through the encoder module, the at least one learning style from the at least one feature map of the plurality of feature maps comprises creating, through the encoder module, the plurality of learning styles from at least one category of the at least one feature map. The at least one feature map is selected from the plurality of feature maps. Further, the step of automatically identifying the at least one learning style comprises extracting, through a style network module, the at least one learning style from the at least one feature map.

In yet another embodiment, the step of automatically generating, through the face image generator module, the frontal facing view of the user based on the at least one face vector of the captured image of the user comprises determining, through the face image generator module, a mirror counterpart corresponding to the captured image of the user based on the at least one face vector. Further, the step of automatically generating the frontal facing view of the user comprises automatically identifying, the frontal facing view of the user based on the at least one face vector and the mirror counterpart corresponding to the captured image of the user.

In one embodiment the system effectively recognizes and generates frontal facing view of a user.

In yet another embodiment the system prevents problem of quality and performance degradation due to rotated faces of the user.

In still another embodiment the system is configured to effectively identify faces from unrestricted views.

In yet another embodiment the system is further configured to enable recognition of the faces from different angles and perspectives, thereby leading to enhancement in accuracy of face identification.

In still another embodiment the system supports improvements in the facial recognition technology, thereby leading to improvements in operation of different security systems.

In still yet another embodiment the system which is further configured to generate a frontal facing view of the user, irrespective of orientation of the face region of the user.

In a further additional embodiment, the system utilizes an image generation algorithm for preserving a user's facial attribute, while frontalizing the face region of the user.

In yet another embodiment the system significantly improves performance of facial recognition modules, that can be used in personalized avatar creation systems and face recognition systems.

In a further additional embodiment, the system identifies the faces of different users from unrestricted views as well as recognizing the faces in forward-facing poses.

In still yet another embodiment a method for generating the frontal facing view of the user, irrespective of the orientation of the face region of the user is being disclosed.

In a further additional embodiment the system is automatic, dedicated, thoroughly designed, and intelligent in terms of its operation.

BRIEF DESCRIPTION OF THE DRAWINGS

FIG. 4 depicts simulation results associated with the generation of the frontal facing view of the user, according to an embodiment as disclosed herein.

Figure 1:
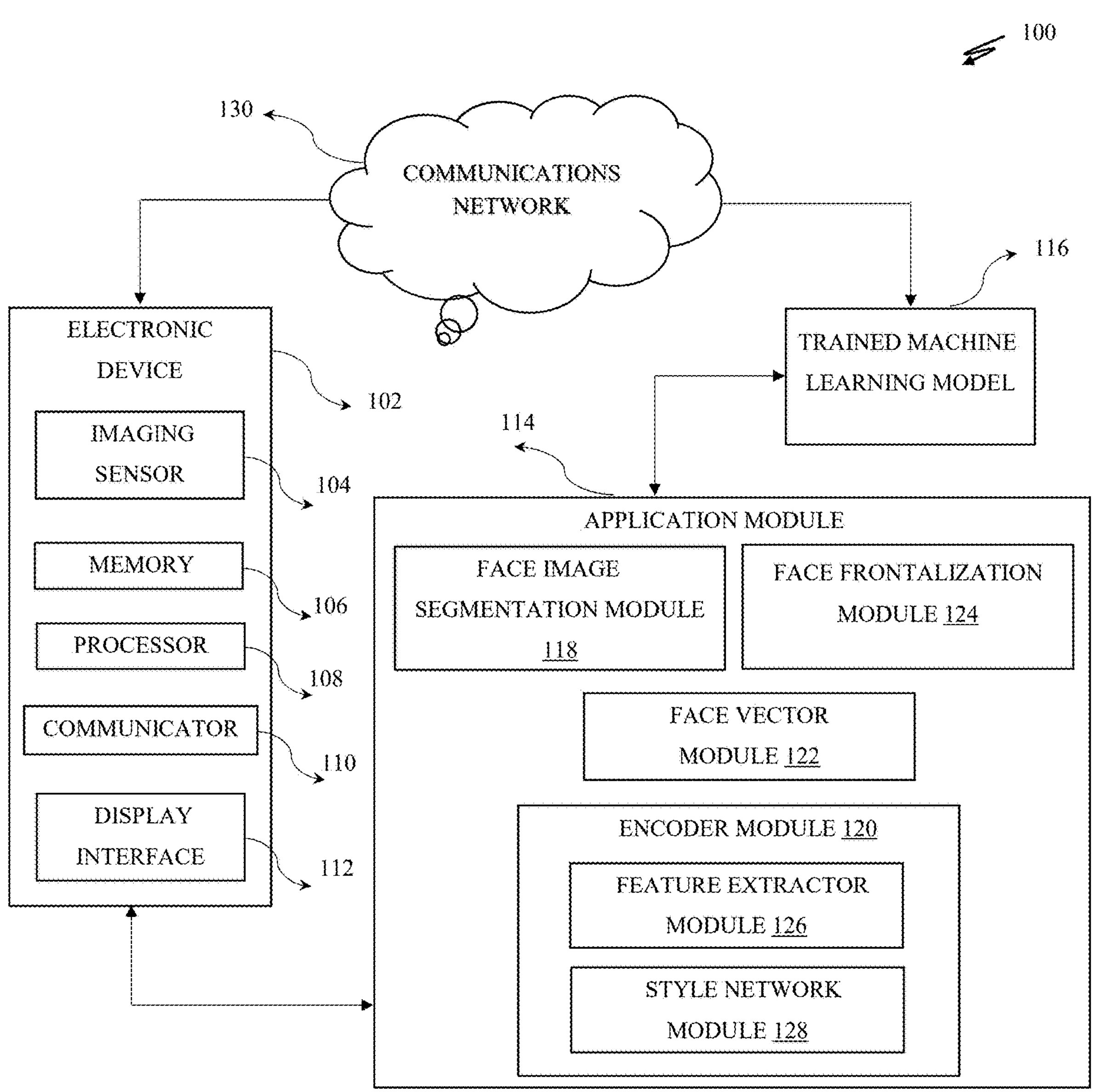
FIG. 1 depicts a block diagram illustrating a system for generating a frontal facing view of a user, according to an embodiment as disclosed herein.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF THE EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

Turning now on to the drawings, systems and methods the invention discloses a system configured to generate a frontal facing view of a user. The disclosed system operates on a principle of focus stacking to produce the frontal facing view of a user or a scene or products with a significant depth. The disclosed system utilizes advanced image segmentation techniques to identify the extent of the face region of the user being photographed. The disclosed system only requires an electronic device, for instance, a user device like a mobile phone or any handheld device and does not require manual intervention. The disclosed system integrates principles from image processing with the machine learning techniques to provide multiple face image frames of the user with a significant focus. The disclosed system is configured to automatically identify at least one learning style and use the at least one learning style to determine a latent vector, to produce the frontal facing view of the user.

In an embodiment, the utilization of principle of artificial intelligence for automatically determining a plurality of feature maps, to facilitate identification of the at least one learning style from at least one feature map of the plurality of feature maps. Further, the identified learning style is implemented over the extent of the face region of the user using the image processing technique to further automatically identify the latent vector of the face region of the user. The automatically identified latent vector of the face region is processed to generate the frontal facing view of the captured image of the user.

Unlike conventional systems and methods, the invention utilizes multiple image sensors for producing an enlarged focal depth, thereby making easy and appropriate for the system to recognize close up images of the user with significant depth and high similarity score values. Moreover, the proposed system and method is less time consuming, as inference time of the system is less. The inference time is the time taken to frontalize the face region of the user.

Accordingly, embodiments herein achieve a method for generating the frontal facing view of the user. The method includes receiving, through an image sensor, the captured image of the user in a preview frame displayed in a field of view (FOV) of the electronic device. Further, the method includes extracting, through the face segmentation module, a face region of the user from the captured image. Further, the method includes automatically determining, through an encoder module, at least one learning style from at least one feature map of the plurality of feature maps. Further, the method includes automatically identifying, through the encoder module, at least one learning style from at least one feature map of the plurality of feature maps. Further, the method includes determining, through a vector module, at least one face vector of the user corresponding to the at least one learning style. Further, the method includes automatically generating, through a face frontalization module, the frontal facing view of the captured image of the user.

The system and method, scene analysis of the face region of the user is performed using a trained machine learning model, thereby identifying the plurality of feature maps corresponding to the face region of the user. Based on the identification of the plurality of feature maps, at least one feature map is selected. The trained machine learning model is configured to automatically identify at least one learning style from the selected at least one feature map. This provides a significant impact on user experience since the user would be easily able to get multiple close-up images of a specific person based on the selected at least one feature map and the at least one learning style. The multiple close-up images of the specific person are captured with different photographic effects including different file formats. This boosts performance of the images sensors embedded within the electronic device.

Referring now to drawings, and more particularly to FIGS. 1 through 5, there are shown preferred embodiments.

FIG. 1 is a block diagram illustrating a system 100 for generating the frontal facing view of the user, according to an embodiment as disclosed herein. The system 100 mainly comprises of an electronic device 102, an application module 114, and a trained machine learning model 116. The electronic device 102 can be, for example, but not limited to a cellular phone, a smart phone, a Personal Digital Assistant (PDA), a tablet computer, a laptop, an Internet of Things (IoT), a smart watch, a virtual reality device, a multiple camera system or the like. The frontal facing view of the user represents front face region of the user generated, irrespective of orientation of the face region of the user. The frontal facing view of the user is the face region of the user which is identified or recognized during different frontal-facing poses of the user. The electronic device 102 comprises of different electronic components in communication with each other. The different electronic components are an imaging sensor 104, a memory 106, a processor 108, a communicator 110, and a display interface 112. The imaging sensor 104 is configured to capture multiple images of the user in the preview frame. At least one image of the captured multiple images is displayed in the FOV of the electronic device 102. The image sensor 104 can be, for example, but not limited to a main camera, an ultra-wide camera, a telephoto camera, a depth camera, a wide camera or the like. In an embodiment, the image of the user captured by the imaging sensor 104 is unrestrictive of the position of the user and facial attributes of the user.

The memory 106 is configured to store instructions to be executed by the processor 108. The memory 106 is further configured to be in operative communication with the imaging sensor 104, to store the captured image of the user. The memory 106 is further configured to store a set of multiple captured original faces of the user. The memory 106 is further configured to store image data set from the captured image of the user. The memory 106 is further configured to store reconstructed image data set associated with the captured image of the user. The memory 106 may include non-volatile storage elements. Examples of such non-volatile storage elements may include magnetic hard discs, optical discs, floppy discs, flash memories, or forms of electrically programmable memories (EEPROM) memories. In addition, the memory 106 may, in some examples, be considered a non-transitory storage medium. The term "non-transitory" may indicate that the storage medium is not embodied in a carrier wave or a propagated signal. However, the term "non-transitory" should not be interpreted that the memory 104 is non-movable. In some examples, the memory 106 can be configured to store large amounts of information. In certain examples, a non-transitory storage medium may store data that can, over time, change (e.g., in Random Access Memory (RAM) or cache).

The processor 108 is configured to be in operative communication with the imaging sensor 104, the memory 106, the communicator 110, and the display interface 112. The processor 108 is further configured to process the captured image of the user. The processor 108 is further configured to process the image data set associated with the captured image of the user. The processor 108 is further configured to process the reconstructed image data set associated with the captured image of the user. The processor 106 is further configured to execute instructions stored in the memory 104 and to perform various operational steps, in order to facilitate the generation of the frontal facing view of the user.

The communicator 110 is configured to communicate internally between internal hardware components and with external devices via one or more networks. The communicator 110 is further configured to send, through the application module 114, the captured image of the user to the electronic device 102. The communicator 110 is further configured to send, through the application module 114, the processed image data set associated with the captured image of the user. The communicator 110 is further configured to send, through the application module 114, the processed reconstructed image data set associated with the captured image of the user.

The display interface 112 is configured to display the captured image of the user, on a screen of the electronic device 102. The display interface 112 is further configured to display the processed image data set associated with the captured image of the user, over the screen of the electronic device 102. The display interface 112 is further configured to display the processed reconstructed image associated with the captured image of the user, over the screen of the electronic device 102.

The application module 114 is configured to be operatively coupled with the electronic device 102 and trained through the trained machine learning model 116 to perform certain operational steps related with the generation of the frontal facing view of the user. The application module 114 is configured to initially receive the captured image of the user in a preview frame displayed in a FOV of the electronic device 102. The application module 114 is further configured to extract the face region of the user from the captured image of the user. The application module 114 is further configured to automatically determine the plurality of feature maps corresponding to the extracted face region. The application module 114 is further configured to automatically identify at least one learning style from the at least one feature map of the plurality of feature maps. The application module 114 is further configured to determine at least one face vector of the user corresponding to the at least one learning style. The application module 114 is further configured to automatically generate the frontal facing view of the user based on the at least one face vector of the captured image of the user.

In certain embodiments, the application module 114 comprises of different software modules operatively coupled with each other and the electronic device 102, to perform the certain operational steps during determining of the frontal facing view of the user. The different software modules are a face image segmentation module 118, an encoder module 120, a face vector module 122, and a face frontalization module 124. The encoder module 120 further comprises a feature extractor module 126 and a style network module 128. The face image segmentation module 118 is configured to extract the face region of the user from the captured image of the user. The face image segmentation module 118 is further configured to segment the captured image of the user into different image segments.

The encoder module 120 is configured to automatically determine the plurality of feature maps corresponding to the extracted face region of the user. The plurality of feature maps are generated from a convolutional layer with the number of them equivalent to the number of convolution kernels in the layer. The plurality of feature maps are obtained by convolving the input maps with their respective kernels, adding bias, and applying an activation function. The encoder module 120 is further configured to automatically identify at least one learning style from the at least one feature map of the plurality of feature maps. The encoder module 120 is further configured to create the plurality of learning styles from at least one category of the at least one feature map selected from the plurality of feature maps. The different categories into which the at least one feature map is classified are: a smallest feature map, a medium feature map, and a biggest feature map.

In certain embodiments, the encoder module 120 is further configured to extract and align the image data set from the captured image of the user.

The face vector module 122 is configured to determine the at least one face vector of the user corresponding to the at least one learning styles. The at least one learning style is selected from the plurality of learning styles. The face vector module 122 is further configured to convert the reconstructed image data into the at least one face vector, based on the at least one learning style extracted from the at least one category of the at least one feature map. The at least one face vector is selected from the plurality of face vectors. The plurality of face vectors are basically intermediate representations corresponding to the captured image of the user.

The face frontalization module 124 is configured to automatically generate the frontal facing view of the user, based on the at least one face vector of the captured image of the user. The face frontalization module 124 is further configured to generate, the frontal facing view of the user, based on the at least one face vector and a mirror counterpart corresponding to the captured image of the user. The frontal facing view of the user is generated irrespective of the orientation of the face region of the user.

In certain embodiments, the face frontalization module 124 is further configured for determining the mirror counterpart corresponding to the captured image of the user based on the at least one face vector.

In certain embodiments, the feature extractor module 122 is configured to be trained through the trained machine learning model 116, to retrieve the plurality of feature maps corresponding to the extracted face region of the user.

In some embodiments, the style network module 124 is configured to be trained through the trained machine learning model 116, for learning at least eighteen target learning styles. The style network module 124 is further configured to extract the at least one learning style from the at least one feature map selected from the plurality of feature maps. The face vector or latent face vector obtained is fed through style Generative Adversarial Network (GAN) based generator of the style network module 124, to generate frontal face of the rotated input image of the user.

The style network module 124 comprises of a tiny mapping network which is a style network and is configured to be trained for learning of each of the eighteen learning styles. The tiny mapping network is further configured to extract the learned styles from appropriate feature map. Out of the learned at least eighteen styles, Styles 0-2 are created from the smallest feature map, Styles 3-6 are created from the medium feature map, and Styles 7-18 are created from the biggest feature map.

The system 100 as shown in FIG. 1 comprises the trained machine learning model 116 communicatively coupled with the electronic device 102, the processor 108, and the application module 114, to perform the operational steps for generating the frontal facing view of the user. The trained machine learning model 116 is configured to train the application module 114 to perform the operational steps. Further, the trained machine learning model 116 is configured to enable the application module 116, to receive the captured image of the user in a preview frame displayed in the FOV of the electronic device 102. Further, the trained machine learning model 116 is configured to enable the application module 116, to extract the face region of the user from the captured image of the user. Further, the trained machine learning model 116 is configured to enable the application module 116, to automatically determine the plurality of feature maps corresponding to the extracted face region. Further, the trained machine learning model 116 is configured to enable the application module 116, to automatically identify at least one learning style from the at least one feature map of the plurality of feature maps. Further, the trained machine learning model 116 is configured to enable the application module 116, to determine at least one face vector of the user corresponding to the at least one learning style. Further, the trained machine learning model 116 is configured to enable the application module 116, to automatically generate the frontal facing view of the user based on the at least one face vector of the captured image of the user.

The electronic device 102, the application module 114, and the trained machine learning model 116 are connected to each other over a communications network 130. The communications network 130 may facilitate a communication link among the components of the system 100. It can be noted that the communication network 130 may be a wired and/or a wireless network. The communication network (130), if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques, known in the art.

Although the FIG. 1 depicts an overview of the electronic device 102 but it is to be understood that other embodiments are not limited thereon. In other embodiments, the electronic device 102 may include one or more number of components. Further, the labels or names of the components are used only for illustrative purposes and does not intend to limit the scope of the invention in any manner.

Figure 2:
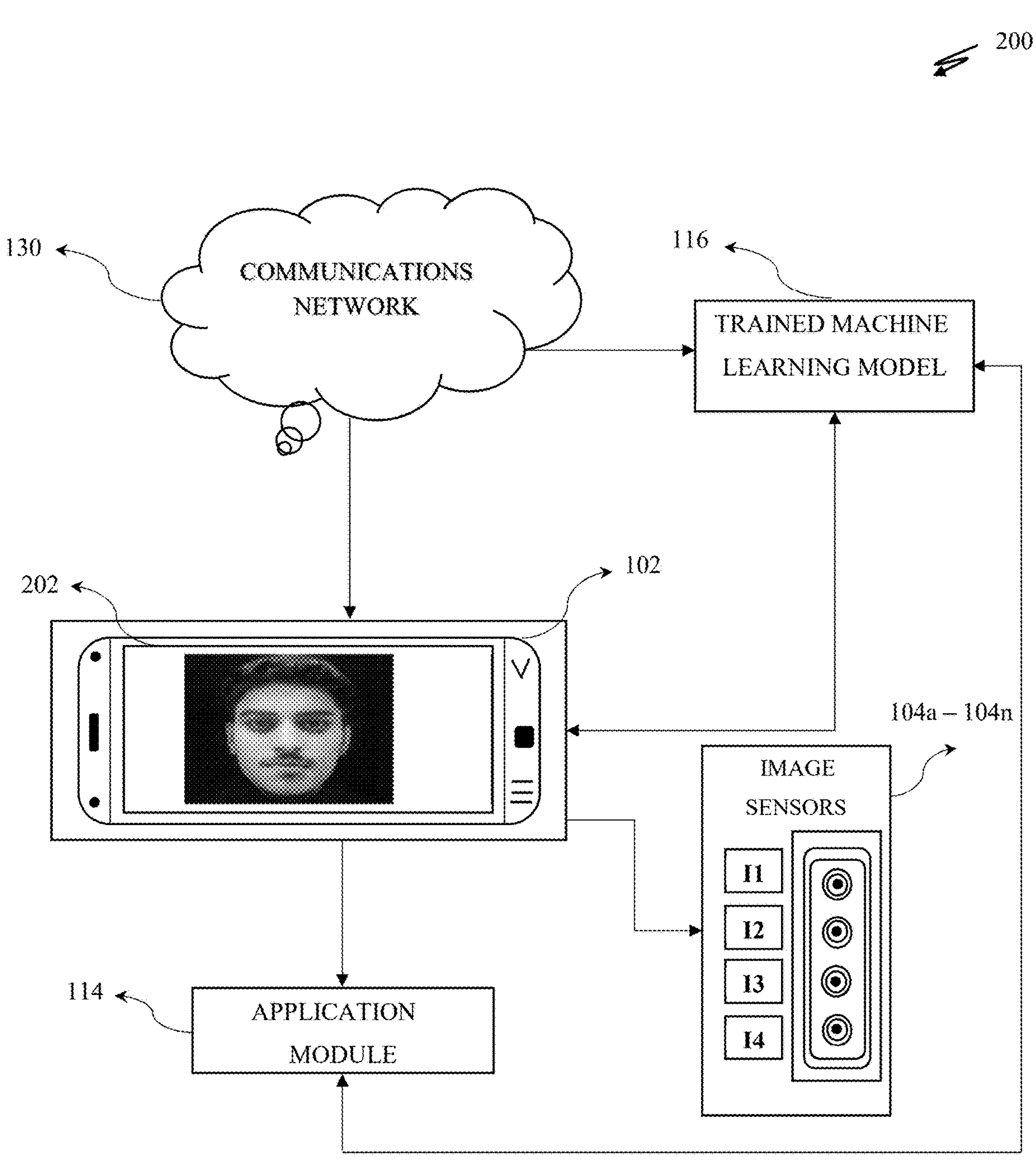
FIG. 2 illustrates an example scenario illustrating a system for extraction of a face region of the user from a captured image, according to an embodiment as disclosed herein.

FIG. 2 is an example scenario illustrating a system 200 for extraction of a face region of the user from a captured image, according to an embodiment as disclosed herein. The system 200 comprises of the electronic device 102 having a plurality of image sensors (104*a*-104*n*), the application module 114, and the trained machine learning model 116 connected to each other over the communication network 130. Each of the plurality of image sensors (104*a*-104*n*) are configured to capture multiple images of the face region of the user. The application module 114 running on a screen of the electronic device 102 comprises of an application window 202 which displays the captured image of the user on the screen of the electronic device 102. At least one image of the captured multiple images is displayed in the FOV of the electronic device 102. The image sensor 104 can be, for example, but not limited to a main camera, an ultra-wide camera, a telephoto camera, a depth camera, a wide camera or the like.

Figure 3:
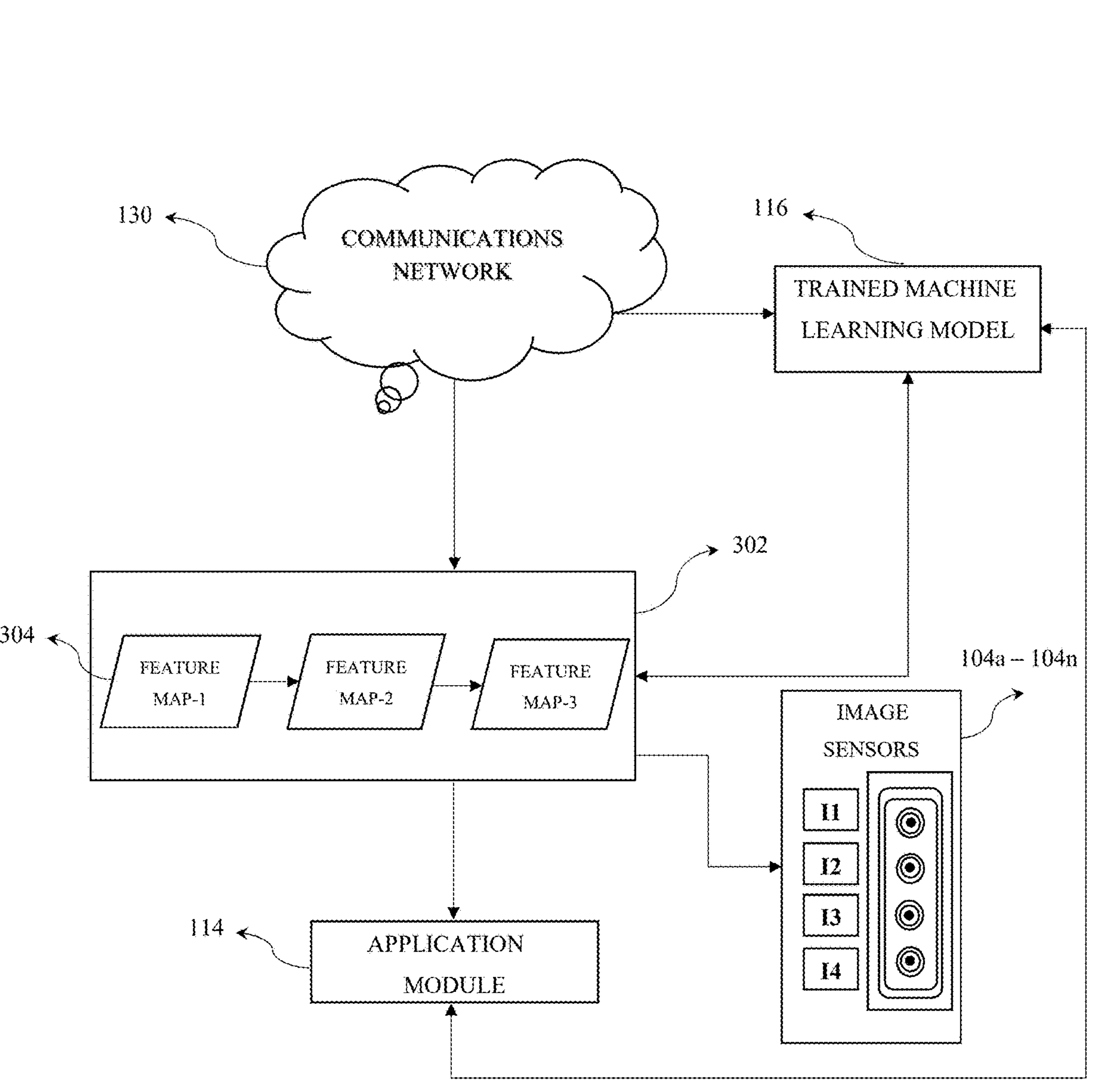
FIG. 3 illustrates another example scenario illustrating a system for creation of a plurality of feature maps, according to an embodiment as disclosed herein.

FIG. 3 is another example scenario illustrating a system 300 for creation of a plurality of feature maps 304, according to an embodiment as disclosed herein. The system 300 comprises of the plurality of image sensors (104*a*-104*n*), the application module 114, and the trained machine learning model 116 connected to each other over the communications network 130. The trained machine learning model 116 is configured to enable the application module 116, to extract the face region of the user from the captured image of the user. Further, the trained machine learning model 116 is configured to enable the application module 116, to automatically determine the plurality of feature maps 304 corresponding to the extracted face region. The plurality of feature maps 304 is configured to be displayed through the application module 116 on a screen 302 of the electronic device 102.

FIG. 4 illustrates simulation results 400 associated with the generation of the frontal facing view of the user, according to an embodiment as disclosed herein. The simulation results 400 illustrate different facing views of the user, during the different frontal-facing poses of the user. These simulation results represent the multiple images corresponding to the different facing views of the user having high and improved similarity (SIM) score values. For instance, the input value for a frontalization time associated with each of these multiple images as shown in FIG. 4 is 1 second, and the target output value for generating each of these multiple images in terms of time period are 0.79 seconds or 0.74 seconds or 0.83 seconds. The target output value is the value associated with the time period for which the output needs to be achieved by the system, based on the input value of 1 second. The output value required to be achieved is obtained after processing of the different multiple images for face identification based on the time of 1 second.

The feature extractor module 122 of the application module 114 is configured to be trained through the trained machine learning model 116, to retrieve the plurality of feature maps corresponding to the extracted face region of the user. The feature extractor module 122 refers to a convolutional neural network, for instance, "Mobile NetV3" in present case used for feature extraction tuned to mobile central processing Units (CPUs), through a combination of hardware aware network architecture search (NAS) complemented by a "NetAdapt" algorithm, and subsequently improved through novel architecture advances. The advances include complementary search techniques, new efficient versions of non-linear practical for a mobile setting, and new efficient network design.

Figure 5:
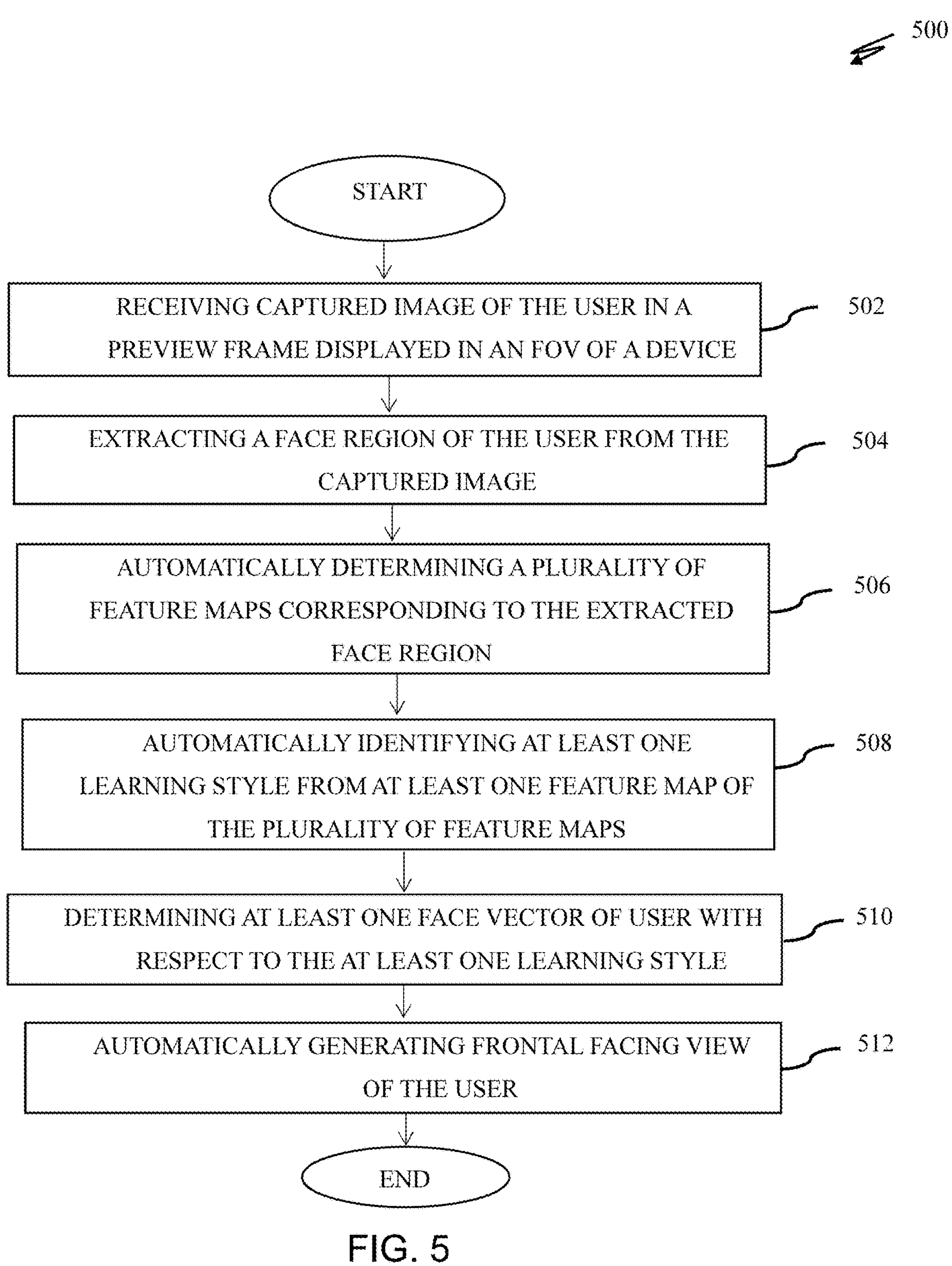
FIG. 5 depicts a flow diagram illustrating various operational steps for generating the frontal facing view of the user, according to the embodiments disclosed herein.

FIG. 5 is a flow diagram illustrating various operational steps for generating the frontal facing view of the user using the application module 114 running on the electronic device 102 and trained through the trained machine learning model 116, according to the embodiments disclosed herein. As shown in FIG. 5, the operational steps (502-512) are performed by the various hardware components and software components or modules of the system 100. These hardware components of the electronic device 102 and the software components of the system 100 are enabled through the trained machine learning model 116 to perform the operational steps. At 502, the method 500 includes receiving, through the imaging sensor 104, the captured image of the user in the preview frame displayed in the FOV of the electronic device 102. At 504, the method 500 includes extracting, through the face image segmentation module 118, the face region of the user from the captured image. At 506, the method 500 includes automatically determining, through the encoder module 120, the plurality of feature maps corresponding to the extracted face region of the user. At 508, the method 500 includes automatically identifying, through the encoder module 120, the at least one learning style from the at least one feature map of the plurality of feature maps. At 510, the method 500 includes determining, through the face vector module 122, the at least one face vector of the user corresponding to the at least one learning style. At 512, the method 500 includes automatically generating, through the face frontalization module 124, the frontal facing view of the user based on the at least one face vector of the captured image of the user. In an embodiment, the method 500 includes storing, through the memory module 106, the set of multiple captured original faces of the user.

In some embodiments, the step 506 of automatically determining, through the encoder module 120, the plurality of feature maps corresponding to the extracted face region comprises retrieving, through the feature extractor module 126, the plurality of feature maps corresponding to the extracted face region of the user.

In certain embodiments, the step 508 of automatically identifying, through the encoder module 120, the at least one learning style from the at least one feature map of the plurality of feature maps includes creating, through the encoder module 120, the plurality of learning styles from the at least one category of the at least one feature map selected from the plurality of feature maps. Further, the step 508 includes extracting, through the style network module (128), the at least one learning style from the at least one feature map. The at least one feature map is selected from the plurality of feature maps.

In certain embodiments, the step 510 of determining, through the face vector module 122, the at least one face vector of the user corresponding to the at least one face vector of the user corresponding to the at least one learning style includes extracting and aligning, through the encoder module 120, the image data set from the captured image of the user. Further, the step 510 includes reconstructing, through the face frontalization module 124, the image data set based on the at least one feature map selected from the plurality of feature maps, and the at least one learning style extracted from the at least one category of the at least one feature map. Further, the step 510 includes converting, through the face vector module 122, the reconstructed image data set into the at least one face vector, based on the at least one learning style extracted from the at least one category of the at least one feature map.

In some embodiments, the step 512 of automatically generating, through the face frontalization module 124, the frontal facing view of the user based on the at least one face vector of the captured image of the user includes determining, through the face frontalization module 124, the mirror counterpart corresponding to the captured image of the user based on the at least one face vector. Further the step 512 includes automatically identifying, through the face frontalization module 124, the frontal facing view of the user based on the at least one face vector and the mirror counterpart corresponding to the captured image of the user.

The system 100 and method 500 of the present invention is configured to improve the performance of facial recognition modules, that may be used in personalized avatar creation systems and face recognition systems. This is accomplished by reducing difficult challenge of identification of the faces from unrestricted views to a simpler problem of recognizing faces in forward-facing poses. Additionally, the system 100 provides aid in improving security systems that rely on facial recognition technology. The system 100 comprises the face frontalization module 124 employed to generate the frontal facing view of the user, irrespective of the orientation of the face. The system 100 and the method 500 of the present invention employs use of image generation algorithm implemented on the encoder module 120 for preserving facial attribute of the user, while frontalizing the face of the user. During training of the system, a random image flipping strategy is applied to force the system 100 to, through the trained machine learning model 116, generate an image that resembles both the captured image of the user and the mirror counterpart of the captured image. The method 500 of the present invention assists the system 100 in achieving a steady frontal position. The face image segmentation module 118 of the system 100 is adapted but configured to be trained again to frontalize faces for generation of the cartoon heads and tuned to meet cartoonization requirements. The system 100 of the present invention has a runtime per frontalization of 1 second for an end to end process, which is very little compared to 120 seconds taken by prior art systems or models with CPU. The system 100 further has a smaller size of 158 Megabytes (MB), and very few artifacts are involved in the system 100, to produce higher SSIM values. Moreover, the system 100 of the present invention involves face regeneration mechanism for profiling of the human being in various domains like identification of criminals, biometric identification, as well as generating the face 3D models using mono images.

The various actions, acts, blocks, steps, or the like in the flow diagram depicting the method (500) may be performed in the order presented, or in a different order, or simultaneously. Further, in some embodiments, some of the actions, acts, blocks, steps, or the like may be omitted, added, modified, skipped, or the like without departing from the scope of the invention.

The embodiments disclosed herein can be implemented using at least one software program running on the at least one hardware device and performing network management functions to control the elements.

Several modifications and additions are introduced to make the system 100 more tolerant to variance like change in the forward-facing poses of the user, bending angle of the electronic device 102, change in photographic effect applied on the captured image of the user, and change in the facial attributes of the user in the deployed environment. Moreover, entire pipeline of the system 100 comprises independent hardware components combined with each other in a manner, such that each independent hardware component work seamlessly to create an automated solution suite that has not been achieved by past automated frontal face image generation systems for the generation of the frontal facing view of the user with the significant depth.

As described herein, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information. For image data, the personal information data may only include data from the images of the user and not the images themselves.

The present disclosure recognizes that the use of such personal information data, in the present technology, can be used to the benefit of users. For example, the personal information data can be used to control unlocking and/or authorizing devices using facial recognition. Accordingly, use of such personal information data enables calculated control of access to devices. Further, other uses for personal information data that benefit the user are also contemplated by the present disclosure.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed:

1. A system for generating a frontal facing view of a user, comprising:

an electronic device characterized by:

an imaging sensor configured to capture an image of the user;

a memory configured to store the captured image of the user;

a processor connected with the memory; and an application module running on the electronic device, connected with the memory and the processor;

wherein the system comprises a trained machine learning model operatively coupled with the electronic device, the processor, and the application module, and the trained machine learning model is configured for:

receive, through the imaging sensor, the captured image of the user in a preview frame displayed in a field of view (FOV) of the electronic device;

extract, through a face image segmentation module, a face region of the user from the captured image;

automatically determine, through an encoder module, a plurality of feature maps corresponding to the extracted face region;

automatically identify, through the encoder module, at least one learning style from at least one feature map of the plurality of feature maps;

determine, through a face vector module, at least one face vector of the user corresponding to the at least one learning style; and automatically generate, through a face frontalization module, the frontal facing view of the user based on the at least one face vector of the captured image of the user.

2. The system of claim 1, wherein the trained machine learning model is further configured to store, in the memory, a set of multiple captured original faces of the user.

3. The system of claim 1, wherein the trained machine learning model is further configured to create a plurality of learning styles from at least one category of the at least one feature map selected from the plurality of feature maps through the encoder module.

4. The system of claim 1, wherein the trained machine learning model is further configured to generate, through the face frontalization module, the frontal facing view of the user based on the at least one face vector and a mirror counterpart corresponding to the captured image of the user, the frontal facing view of the user generated irrespective of the orientation of the face region of the user.

5. The system of claim 1, wherein the trained machine learning model is further configured to determine, the mirror counterpart corresponding to the captured image of the user based on the at least one face vector through the face frontalization module.

6. The system of claim 1, wherein the image of the user captured by the imaging sensor is unrestrictive of position of the user and facial attributes of the user.

7. The system of claim 1, wherein the encoder module further comprises a feature extractor module configured to retrieve, the plurality of feature maps corresponding to the extracted face region, through the trained machine learning model.

8. The system of claim 1, wherein the encoder module further comprises a style network module configured to be trained for at least eighteen target learning styles and extract the at least one learning style from the at least one feature map, the at least one feature map selected from the plurality of feature maps.

9. The system of claim 1, wherein the trained machine learning model is further configured to extract and align, an image data set from the captured image of the user through the encoder module.

10. The system of claim 9, wherein the trained machine learning model is further configured to reconstruct the image data set based on the at least one feature map selected the plurality of feature maps and at least one learning style extracted from the at least one category of the at least one feature map, through the face frontalization module.

11. The system of claim 10, wherein the trained machine learning model is further configured to convert the reconstructed image data into the at least one face vector, based on the at least one learning style extracted from the at least one category of the at least one feature map through the face vector module.

12. The system of claim 1, wherein the electronic device is, but not limited to, a mobile device, a laptop, a personal computer, a personal digital assistant (PDA), or any other handheld device.

13. A method of generating a frontal facing view of a user, the method comprising:

receiving, through the imaging sensor, a captured image of the user in a preview frame displayed in a field of view (FOV) of an electronic device;

extracting, through a face image segmentation module, a face region of the user from the captured image;

automatically determining, through an encoder module, a plurality of feature maps corresponding to the extracted face region;

automatically identifying, through the encoder module, at least one learning style from at least one feature map of the plurality of feature maps;

determining, through a face vector module, at least one face vector of the user corresponding to the at least one learning style; and automatically generating, through a face frontalization module, the frontal facing view of the user based on the at least one face vector of the captured image of the user.

14. The method of claim 13, further comprising:

storing, through the memory module, a set of multiple captured original faces of the user.

15. The method of claim 13, wherein determining the plurality of feature maps corresponding to the extracted face region through the encoder module comprises:

retrieving, through a feature extractor module, the plurality of feature maps corresponding to the extracted face region.

16. The method of claim 13, wherein identifying at least one learning style from the at least one feature map of the plurality of feature maps through the encoder module comprises:

creating, through the encoder module, the plurality of learning styles from at least one category of the at least one feature map selected from the plurality of feature maps; and extracting, through a style network module, the at least one learning style from the at least one feature map, the at least one feature map selected from the plurality of feature maps.

17. The method of claim 13, wherein determining at least one face vector of the user corresponding to the at least one learning style through the face vector module comprises:

extracting and aligning, through the encoder module, an image data set from the captured image of the user;

reconstructing, through the face frontalization module, the image data set based on the at least one feature map selected from the plurality of feature maps, and the at least one learning style extracted from the at least one category of the at least one feature map; and converting, through the face vector module, the reconstructed image data set into the at least one face vector, based on the at least one learning style extracted from the at least one category of the at least one feature map.

18. The method of claim 13, wherein generating the frontal facing view of the user based on the at least one face vector of the captured image of the user through the face frontalization module comprises:

determining, through the face frontalization module, a mirror counterpart corresponding to the captured image of the user based on the at least one face vector; and automatically identifying, through the face frontalization module, the frontal facing view of the user based on the at least one face vector and the mirror counterpart corresponding to the captured image of the user.

19. The method of claim 13, wherein the electronic device is, but not limited to, a mobile device, a laptop, a personal computer, a personal digital assistant (PDA), or any other handheld device.

20. The method of claim 13, wherein the image of the user captured by the imaging sensor is unrestrictive of position of the user, orientation of the face region of the user, and facial attributes of the user.

* * * * *